United States Patent [19]

Takahashi et al.

[11] Patent Number: 4,830,477

[45] Date of Patent: May 16, 1989

[54] ZOOM LENS CAPABLE OF OBTAINING FOCAL LENGTHS BEYOND A VARIABLE FOCAL LENGTH RANGE

[75] Inventors: Sadatoshi Takahashi, Tokyo; Keiji Ikemori, Kanagawa; Nozomu Kitagishi, Tokyo; Tsunefumi Tanaka, Kanagawa; Takashi Matsushita, Kanagawa; Kikuo Momiyama, Kanagawa, all of Japan

[73] Assignee: Canon Kabushiki Kaisha, Tokyo, Japan

[21] Appl. No.: 724,280

[22] Filed: Apr. 17, 1985

[30] Foreign Application Priority Data

Apr. 19, 1984 [JP] Japan .................................. 59-79084

[51] Int. Cl.$^4$ .............................................. G02B 15/20
[52] U.S. Cl. ..................................... 350/428; 350/427
[58] Field of Search ........................ 350/423, 427, 428

[56] References Cited

U.S. PATENT DOCUMENTS 4,132,463  1/1979  Sakaguchi et al. ................. 350/428
4,269,484  5/1981  Laurent ................................ 350/427
4,437,732  3/1984  Ishiyama ............................ 350/427
4,636,040  1/1987  Tokumaru .......................... 350/427
4,696,553  9/1987  Tsuji et al. .......................... 350/427

Primary Examiner—Bruce Y. Arnold
Assistant Examiner—Scott J. Sugarman
Attorney, Agent, or Firm—Fitzpatrick, Cella, Harper & Scinto

[57] ABSTRACT

A zoom lens comprising, from front to rear, a first zoom section and a second zoom section, the first zoom section having a plurality of movable lens units which simultaneously move to effect zooming, and the second zoom section having a plurality of axially movable lens units, the light beam exiting from the rearmost unit in the first section enters directly the frontmost unit in the second section, and the refractive powers of the front and rear lens units are made positive and negative respectively, whereby the front and rear lens units are simultaneously moved in such a way that the magnifying power of the rear lens unit remains positive when the focal length of the entire system varies.

14 Claims, 5 Drawing Sheets

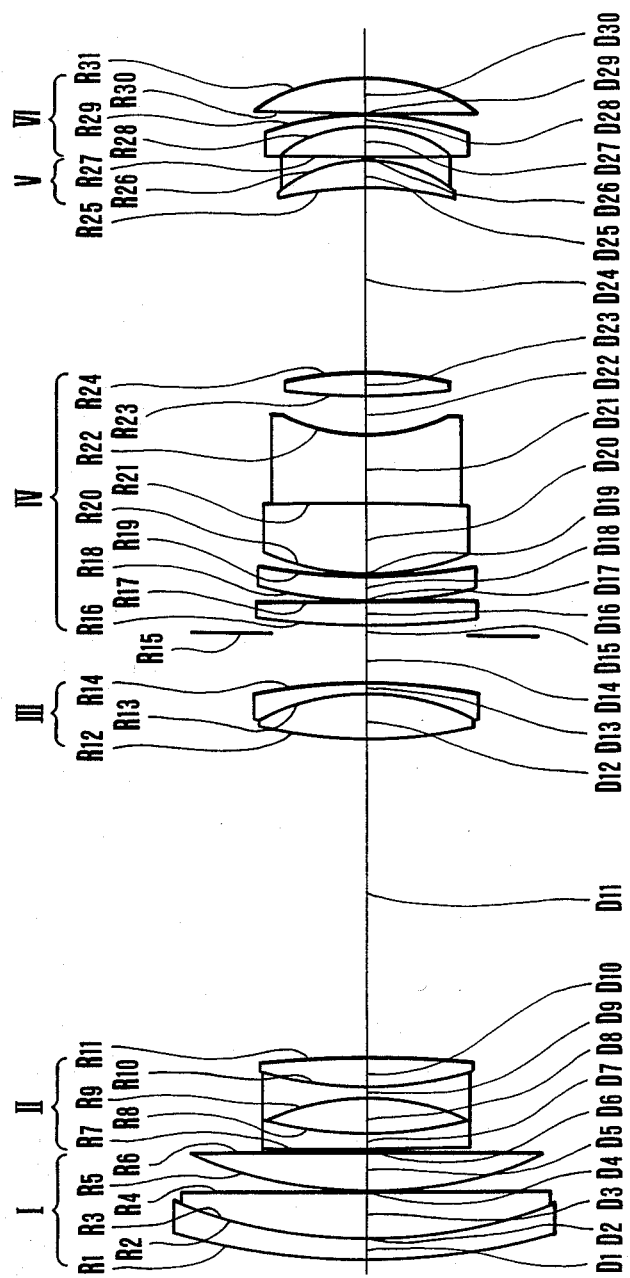

ZOOM LENS CAPABLE OF OBTAINING FOCAL LENGTHS BEYOND A VARIABLE FOCAL LENGTH RANGE

BACKGROUND OF THE INVENTION

1. Field of the Invention

This invention relates to zoom lenses suited to still cameras, cine cameras, and video camers, and more particularly to long focal length zoom lenses of extended range.

2. Description of the Prior Art

Recently, in many fields of art, there have been increasing demands for zoom lenses of high zoom ratios or extended range.

To achieve a great increase in the zoom ratio, the lens designers have generally courted the method of increasing the total movement of the zoom lens units, or the method of strengthening the refractive powers of the zoom units, or the method of increasing the number of zoom units to, for example, 3 or 4. Of these, the first method is unavoidably associated with a disadvantage of increasing the total length of the lens. The use of the second method results in increasing the amount of aberrations produced, making it difficult to maintain proper stability of aberration correction throughout the extended zooming range.

The employment of the third method is disclosed in Japanese Laid-Open Patent Application No. SHO 57-2014 wherein the zoom lens has five lens units, all movable for zooming. This zoom lens may be considered derived from the prior known 2-component zoom lens whose front component is of positive power and rear component is of negative power with the separation therebetween being variable to effect zooming. That is, the front component is divided into two lens units of which the first counting from the front has a positive refractive power, and the second has a negative refractive power, and the rear component is divided into three lens units which are respectively positive, negative and positive in refractive power. And, when zooming, the separation between the first and second lens units increases with the advantage that even the second lens unit contributes to an image magnification varying effect. Furthermore, the third, fourth and fifth lens units are moved in such a way as to increase the image magnification varying effect of the entire system. Thus, a zoom lens of high range is realized. In this lens, the rays of light arriving at the third lens unit are of divergence, and are then subjected to convergence, divergence and convergence successively in passing through the third, fourth and fifth lens units respectively. Such a zoom type is, therefore, advantageous in ensuring the necessary back focal distance for wide angle zoom lenses, but in application to telephoto zoom lenses, tends to increase the length from the front vertex of the third lens unit to the image plane with an increase in the total length of the zoom lens.

The method for obtaining focal lengths beyond the variable focal length range is also known, by constructing the zoom lens in tandem form in U.S. Pat. No. 4,033,674. That is, the front zoom section is followed by a stationary lens component, a compensator, and variator and an image forming lens component which constitute the rear zoom section. Though this form has the merit of providing the possibility of operating the front and rear zoom sections simultaneously, the disadvantage is that it increases greatly the total length. For this reason, that zoom lens is adapted to be used in full size television cameras which work in broadcasting stations, and its form has never been employed in designing lenses for single lens reflex cameras and small size video cameras.

Mention should also be made of another known method by using an attachment lens in a space of the image forming lens component of the zoom lens. But, the creation of this space calls for a large increase in the total length of the lens. Another problem is that when the attachment lens is not in use, another space that accomodates it is necessitated. Therefore, this method cannot be advantageously used in interchangeable lenses.

An object of the present invention is to provide a zoom lens capable of greatly varying the focal length.

Another object is to provide a zoom lens of short total length with high performance.

Still another object is to achieve longer focal lengths than the longest of the peculiar focal length range.

SUMMARY OF THE INVENTION

Of the relatively long focal length zoom lenses for 35 mm still cameras, the typical one has a focal length range of 70 to 210 mm with the zoom ratio of 3.

In FIG. 1, there is shown the paraxial optical arrangement of this zoom lens along with how to move the zoom lens units over the entire range. A first lens unit I has a positive refractive power and is movable for focusing. A second lens unit II, as the variator, has a negative refractive power. A third lens unit III, as the compensator, has a positive refractive power. A fourth lens unit IV, as the image forming lens, has a positive refractive power. And, the second and third lens units II and III are moved in a way indicated by the arrows to vary the focal length of the entire system.

As usual, in most of the telephoto type zoom lenses, the light rays emerging from the third lens unit III are almost afocal. In the following, for the purpose of simplicity, discussion is conducted on assumption that the light rays emerging from the third lens unit III are afocal. Now letting focal lengths ofthe first, third and fourth lens units I, III, IV be identified by f1, f3 and f4 respectively, and a image magnification owing to the second lens unit II by $\beta 2$, the focal length F of the entire system can be written as:

$$F = f1 \times \beta 2 \times \frac{f4}{f3}$$

In order to achieve an increase in the zoom ratio by proceeding the zooming beyond either the telephoto or the wide angle end of the zooming range, it is required that at least one of the following methods be carried out.

(a) To change the focal length f1 in the telephoto or wide angle position.

(b) To change the image magnification of the second lens unit.

(c) To change the focal length f3.

(d) To change the focal length f4.

To extend the zooming rnage from, for example, the telephoto end to further longer focal lengths, if the method (a) or (d) is adopted, the focal length f1 or f4 has to be changed to a larger value, if the method (b) is adopted, the image magnification $\beta 2$ has to be increased, and if the method (c) is adopted, the focal length f3 has to be changed to smaller values. To extend the zooming range from the wide angle end to further shorter focal lengths, the direction of change only has to be reversed.

In practice, for the methods (a) and (c), for example, one spacing between two lenses in the first 1 or third lens unit III may be changed. However, because a space that allows for changing that spacing must be provided in the lens unit, the longitudinal length of the zoom lens increases objectionably.

For the method (b), there is need only to increase the total movement of te second lens unit II. But the diameters of the first and second lens units I, II tend to greatly increase to.

The method (d) when applied to telephoto type zoom lenses is advantageous, because the telephoto type zoom lens has its image forming, or fourth lens unit IV become relatively long in the longitudinal direction, and the spacings between the successive two lenses in the fourth unit IV are relatively long.

BRIEF DESCRIPTION OF THE DRAWINGS

FIG. 6 is a longitudinal section view of an example of a specific zoom lens of the present invention.

DETAILED DESCRIPTION OF THE PREFERRED EMBODIMENTS

Figure 1:
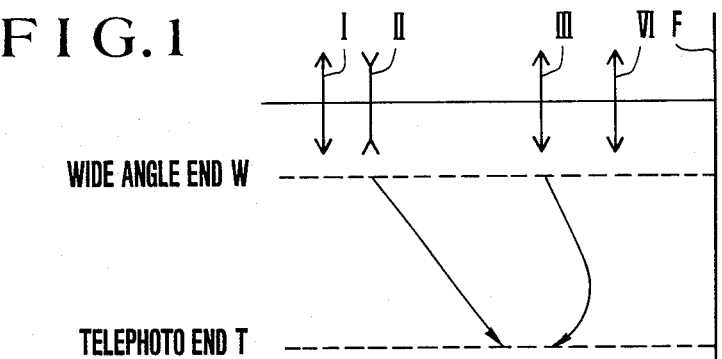
FIG. 1 is a schematic diagram of the paraxial optical arrangement of a telephoto type zoom lens with motion of the zoom units.

Considering the point that in the telephoto type zoom lens, its image forming lens unit becomes relatively long in physical length and contains long air spacings, the present invention provides a second zoom section in the image forming lens unit behind the usual or first zoom section which includes two movable lens units A1 and A2, wherein the second zoom section is constructed with at least two lens units B1 and B2 of positive and negative refractive powers respectively, and starts to move at a time just at or near when the first zoom section A1 and A2 reaches the terminal end of zooming movement thereof, thereby a second zooming range is executed consecutive with the first zooming range. Thus, a higher range zoom lens is achieved. And, in the present invention, the refractive powers of the lens units B1 and B2 are positive and negative respectively, and a refractive power distribution over all the lens units of the entire system is so determined that an image magnification $\beta 22$ of the lens unit B2 is positive. Moreover, both of the lens units B1 and B2 are movable at one time to promote the efficiency in which the second zooming range is formed. Particularly in the embodiment of the invention to be described later, the first zooming range is extended from the telephoto end toward further, longer focal lengths. This provides achievement of a super telephoto zoom lens. And, it is preferred to design the construction and arrangement of the lens elements of the entire system in such a way that the image magnification $\beta 22$ of the lens unit B2 becomes positive so that the light rays emerging from the lens unit B2 converge. It should be noticed that the second zoom section B1 and B2 may be otherwise constructed by giving a negative magnification to the lens unit B2 as in the first zoom section A1 and A2, in other words, by making the light rays emerging from the lens unit B2 divergent. But, because the light rays are diverged once within the image forming lens unit, the total length of the image forming lens unit increases. This increases the size of the complete lens. Another disadvantage is that as the exciting rays from the lens unit B2 are divergent, the lens units that follow can bring the arriving rays into focus only when the complexity of their construction is increased. This also contributes to an increase in the size of the complete lens. Use of the feature that the light rays emerging from the lens unit B2 to converge, or that the image magnification $\beta 22$ is positive prevents the relay lens from increasing in size even though the image forming lens unit contains the second zoom section B1 and B2. Another negative lens unit B2 provide a telephoto type arrangement within the image forming lens unit, the back focal distance can be shortened, and, therefore, the total length of the image forming lens unit (from the front vertex of the image forming lens unit to the image plane) can be shortened.

The zoom lens of the invention can be achieved by satisfying all the above-stated constructional features. But to achieve in increase in the zoom ratio by extending the zooming range from the telephoto end toward further longer focal lengths, it is preferable to satisfy the following conditions:

$$\frac{1}{2} |fR| < fB1 < fT \quad (1)$$

$$|f2| < fB2 < fT \quad (2)$$

where reference symbols fB1 and fB2 identify focal lengths of the lens units B1 and B2 respectively, fT identifies the longest focal length of the entire system in the first zooming range, fR identifies the shortest focal length of the second zoom section, and f2 identifies a focal length of the lens unit A2.

Inequalities of condition (1) represent the limits for the focal length of the lens unit B1 that starts to move when the first zooming range transfers to the second zooming range, or moves when longer focal lengths than the longest focal length of the first range are obtained. When the upper limit is exceeded, or the refractive power is weaker than the limit, the total zooming movement of the first lens unit B1 of the second zoom section B1 and B2 also must be increased. Because an additional air space must be created within the lens system, the physical length of the second zoom section B1 and B2 is increased objectionably. When the lower limit is exceeded, the refractive power of the first lens unit B1 is too strong to stabilize the aberrations throughout the second range. Particularly, the spherical aberration varies to such a great extent and the degree of sensitivity of the image shift to axial displacement of the lens unit B1 becomes so large that the tolerances of design parameters become extremely severe.

Inequalities of condition (2) represent the limits for the focal length of the second lens unit B2. When the upper limit is exceeded, or the refractive power of the lens unit B2 is weaker than that limit, the total zooming movement of the second lens unit B2 for the second zooming range must be increased, and, therefore, the physical length of the second zoom section B1 and B2 increases objectionably as in the former case. When the lower limit is exceeded, the variation range with zooming of aberrations is increased. Particularly over-correction of spherical aberration results at the super telephoto end of the second zooming range, which is difficult to properly correct.

The present invention is next described in connection with embodiments thereof by reference to FIGS. 2 to 5.

Figure 2:
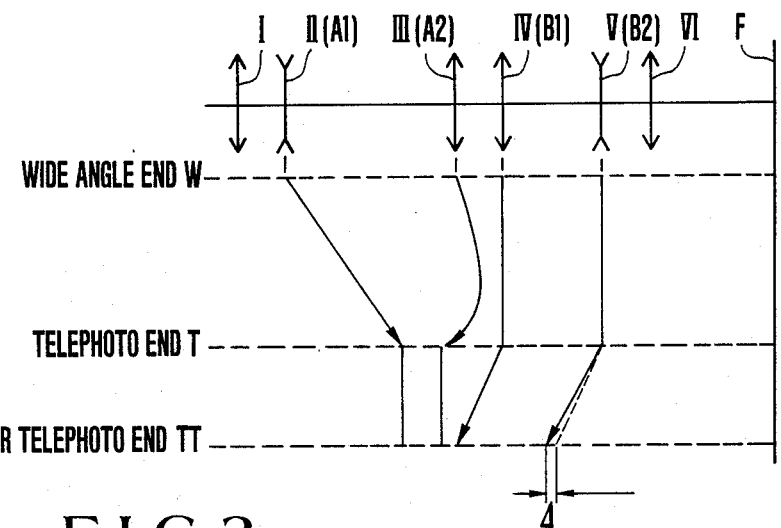
FIGS. 2 to 5 are schematic diagrams of the paraxial optical arrangements and zooming movements of embodiments of zoom lenses according to the present invention.

The zoom lens of FIG. 2 has six lens units of which the refractive powers are positive, negative, positive, positive, negative and positive, in this order, from the front. When zooming in the first range from the wide angle end W to the telephoto end T, the second lens unit II as a variator and a third lens unit III as the compensator are moved axially in differential relation as shown by curves. It is then in the second range that when zooming from a telephoto end T of the first range to the super telephoto end TT, while the second and third lens units II and III are held stationary, the fourth and fifth lens units IV and V are moved axially forward as indicated by arrows. In this case, the axial separation between these two lens units IV, V decreases continuously throughout the range, thereby giving an advantage of lessening variation of the aberrations. Δ shows the decrease. Though, in this embodiment, the fourth and fifth lens units IV, V are both moved linearly, either or both may be otherwise moved non-linearly so that even in this range it can be used as a zoom lens.

In this embodiment, there is not always need to use all the focal lengths in the second zooming range. For example, only the super telephoto end TT may be made operative. If either or both is or are deviated largely from the zooming paths so that the telephoto end and the super telephoto end TT are substantially usable, aberration correction becomes easy to perform, and the lens design also becomes simple.

Also in this embodiment, because when in the first zooming range, the third lens unit III is moved first rearward as zooming goes from the wide angle end W, and then forward as the zooming nears the telephoto end, it is, therefore, at the telephoto end T that a large air space is formed between the third and fourth lens units III and IV. In this embodiment, this air space is effectively used as a space for accommodating movement of the fourth lens unit IV when in the second zooming range, so that the wasteful space within the lens system is much as reduced as before possible.

Note, in this embodiment, the sixth lens unit VI in some cases may take a negative refractive power, depending on whether the preceding or fourth and fifth lens units IV, V are strong or weak. Also, the sixth lens unit IV, becomes effective when aberration correction with zooming in the first and second ranges is controlled. But without having to provide it, the object of the invention can be accomplished.

Note, reference symbol F identifies a focal plane.

Figure 3:
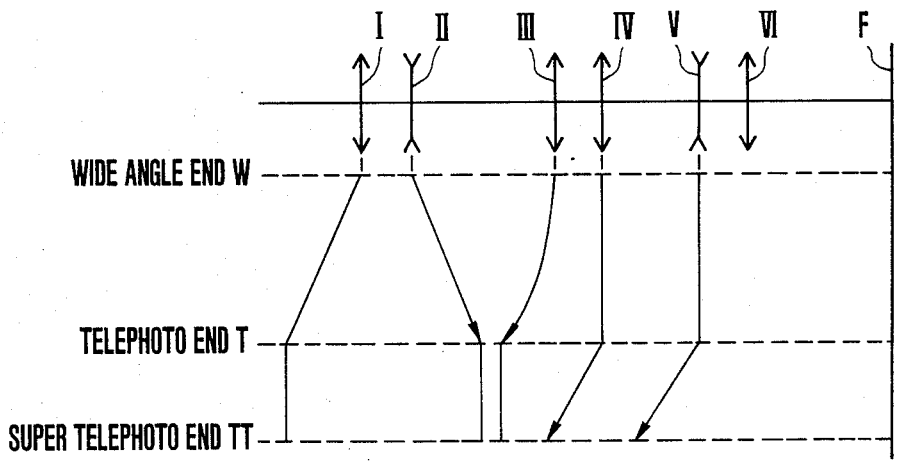

The zoom lens of FIG. 3 has six lens units I, II, III, IV, V, VI of which the first to the fifth I, II, III, IV, V counting from the front have respectively positive, negative, positive, positive and negative refractive powers, and the sixth VI has a positive or negative refractive power. This lens is different from the lens of FIG. 2 in that the first three or first, second and third lens units I, II and III are moved axially in differential relation to one another, after as shown by arrows, when zooming in the first range. Impartment of such forward movement to the first lens unit I enhances the power varying effect of the second lens unit II to achieve a high zoom ratio. The second zooming range is formed by moving the fourth and fifth lens units IV, V. The sixth lens unit VI, similar to the lens of FIG. 2, is not always necessary. By using the arrangment that the first lens unit I moves forward, the axial separation between the third and fourth lens units III, IV in the wide angle end can be reduced from that in the first embodiment with the advantage of shortening the physical length of the lens. Also in the telephoto end, T the separation between the third and fourth lens units, III, IV can be widened to allow for an increase of the total zooming movement of the fourth and fifth lens units IV, V in the second range. This makes it possible to enhance the power varying effect of the second zoom section and achieve a further extension of the second zooming range toward the more super telephoto side TT.

It should be pointed out here that the present invention has a great advantage on the imaging forming lens unit of the telephoto type zoom lens, but is applicable to wide angle zoom lenses.

Figure 4:
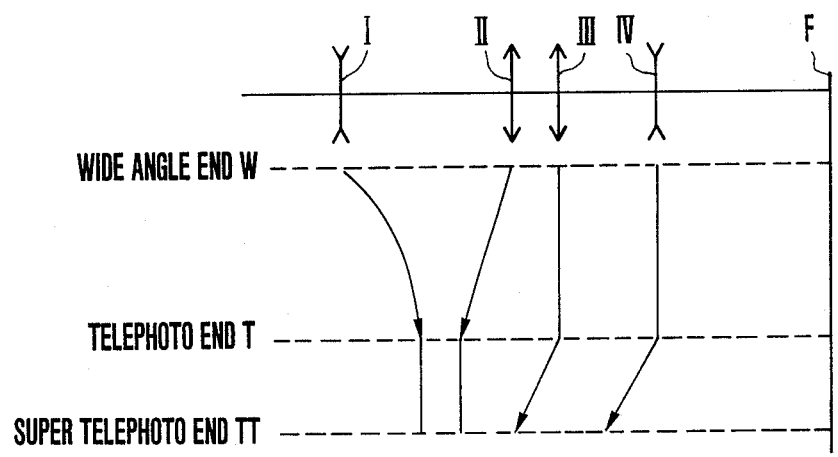

The zoom lens of FIG. 4 has four lens units I, II, III, IV of which the first I to the fourth IV counting from the front, have respectively negative, positive, positive and negative refractive powers. The first zooming range is formed by moving the first and second lens units I and II as shown by arrows, and the second zooming range is formed by moving the third and fourth lens units III and IV as shown by arrows.

This embodiment provides the 2-component zoom lens with a second zoom section to achieve an increase in the zoom ratio which is difficult for the 2-component zoom lens alone to achieve. Between the third and fourth lens units III and IV there may be provided an additional lens unit which is either stationary or movable during zooming in the second range.

Figure 5:
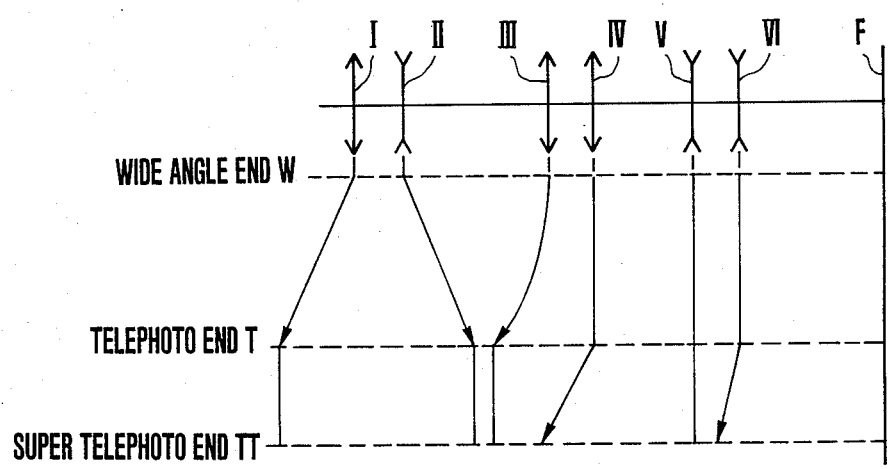
Figure 7A:
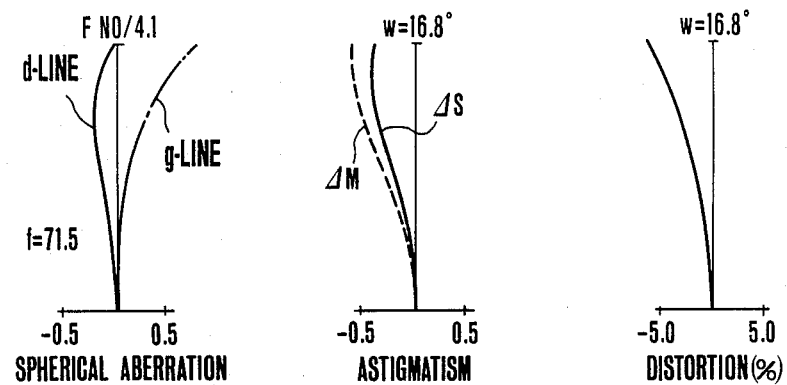
FIGS. 7(A) to 7(D) are graphic representations of the various aberrations of the lens of FIG. 6, with FIG. 7(A) in the wide angle position, FIG. 7(B) in an intermediate position, FIG. 7(C) in the telephoto position and FIG. 7(D) in a super telephoto position.
Figure 7B:
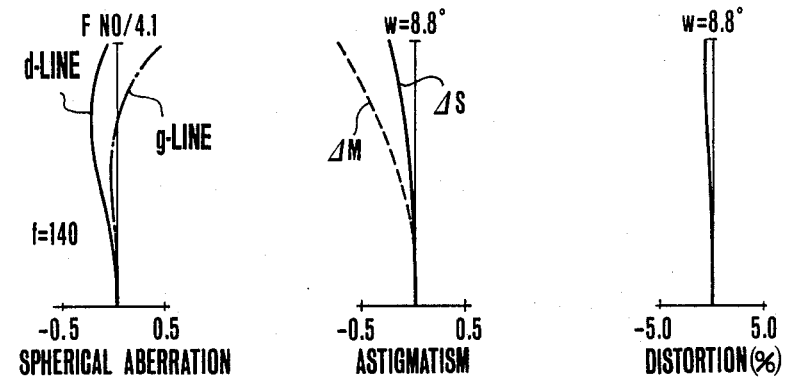
Figure 7C:
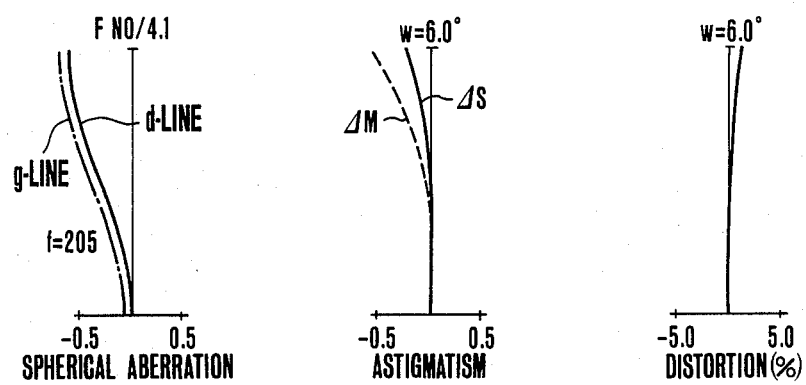
Figure 7D:
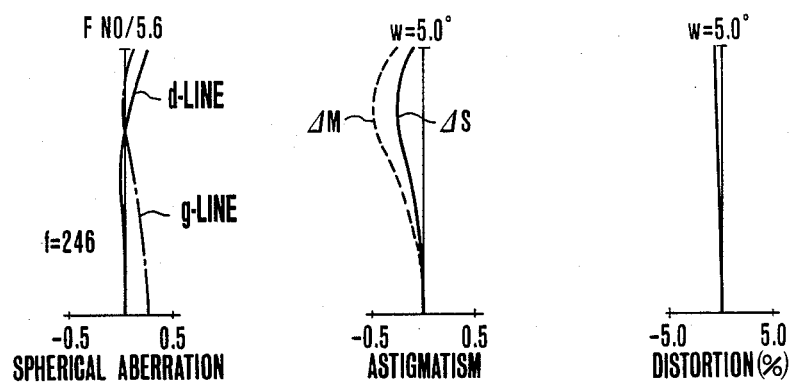

The zoom lens of FIG. 5 is obtained by modifying the lens of FIG. 3 in such a way that instead of the fifth lens unit V, the sixth lens unit VI of negative power moves in the second zooming range. In this embodiment, the fifth lens unit V may be either stationary or movable when in the second zooming range.

As has been described above, according to the present invention, it is possible to achieve a compact high range zoom lens, and particularly to achieve a zoom lens of extended range toward the telephoto side T.

A numerical specific example of the lens of FIG. 2 can be constructed in accordance with the data given in the following tables for radii of curvature, R, axial thicknesses and air separations, D, and refractive indices, N, and Abbe numbers, $v$, of the glasses of the lens elements with the subscripts numbered consecutively from front to rear. The zoom lens comprises, from front to rear, the first lens unit I having a positive refractive power, the second lens unit II having a negative refractive power, the third lens unit 14 having a positive refractive power, the fourth lens unit IV having a positive refractive power, the fifth lens unit V having negative refractive power, and the sixth lens unit II having a positive refractive power. The focal lengths of these lens units are:

$$f1 = 97.54, \quad f2 = -35.56, \quad f3 = 113.72,$$
$$f4 = 75.0, \quad f5 = -70.0, \quad f6 = 1440$$

where reference symbol fi identifies the focal length of the i-th lens unit.

The overall focal length of the fourth to sixth lens units IV, V, VI in the wide angle end is 124.3.

The magnifying power of the fifth lens unit V is 1.56 in the telephoto end, T and 1.87 in the super telephoto end TT.

In this example, the light rays emerging from the third lens unit III are afocal.

Example 1

F = 71.5-246  FNO = 1:4  2ω = 37.7°-10.1°

| | | | |
|---|---|---|---|
| R1 = 110.51 | D1 = 2.70 | N1 = 1.76182 | ν1 = 26.6 |
| R2 = 70.06 | D2 = 0.10 | | |
| R3 = 71.10 | D3 = 7.00 | N2 = 1.43387 | ν2 = 95.1 |
| R4 = −1092.86 | D4 = 0.10 | | |
| R5 = 64.71 | D5 = 6.00 | N3 = 1.48749 | ν3 = 70.1 |
| R6 = −1456.43 | D6 = Variable | | |
| R7 = 712.07 | D7 = 2.19 | N4 = 1.81600 | ν4 = 46.6 |
| R8 = 50.43 | D8 = 4.30 | | |
| R9 = −45.41 | D9 = 2.09 | N5 = 1.78650 | ν5 = 50.0 |
| R10 = 47.68 | D10 = 4.23 | N6 = 1.84666 | ν6 = 23.9 |
| R11 = −265.70 | D11 = Variable | | |
| R12 = 97.53 | D12 = 6.00 | N7 = 1.51742 | ν7 = 52.4 |
| R13 = −35.61 | D13 = 1.50 | N8 = 1.69895 | ν8 = 30.1 |
| R14 = −80.27 | D14 = Variable | | |
| R15 = Stop | D15 = 1.00 | | |
| R16 = 119.52 | D16 = 3.50 | N9 = 1.59270 | ν9 = 35.3 |
| R17 = −14115.43 | D17 = 0.15 | | |
| R18 = 68.95 | D18 = 3.50 | N10 = 1.56444 | ν10 = 43.8 |
| R19 = 120.41 | D19 = 0.15 | | |
| R20 = 37.32 | D20 = 10.04 | N11 = 1.51118 | ν11 = 51.0 |
| R21 = −250.17 | D21 = 9.78 | N12 = 1.84666 | ν12 = 23.9 |
| R22 = 32.53 | D22 = 5.07 | | |
| R23 = 109.28 | D23 = 3.00 | N13 = 1.69895 | ν13 = 30.1 |
| R24 = −71.94 | D24 = Variable | | |
| R25 = −50.85 | D25 = 3.50 | N14 = 1.83400 | ν14 = 37.2 |
| R26 = −22.16 | D26 = 1.00 | N15 = 1.77250 | ν15 = 49.6 |
| R27 = 1071.61 | D27 = Variable | | |
| R28 = −24.94 | D28 = 1.83 | N16 = 1.81600 | ν16 = 46.6 |
| R29 = −55.23 | D29 = 0.15 | | |
| R30 = 342.35 | D30 = 5.00 | N17 = 1.51118 | ν17 = 51.0 |
| R31 = −33.51 | | | |

| f | 71.5 | 140 | 205 | 246 |
|---|---|---|---|---|
| D6 | 0.496 | 26.420 | 34.999 | 34.999 |
| D11 | 45.511 | 22.906 | 1.456 | 1.456 |
| D14 | 7.000 | 3.682 | 16.552 | 2.275 |
| D24 | 26.311 | 26.311 | 26.311 | 18.811 |
| D27 | 4.000 | 4.000 | 4.000 | 25.778 |

Figure 8:
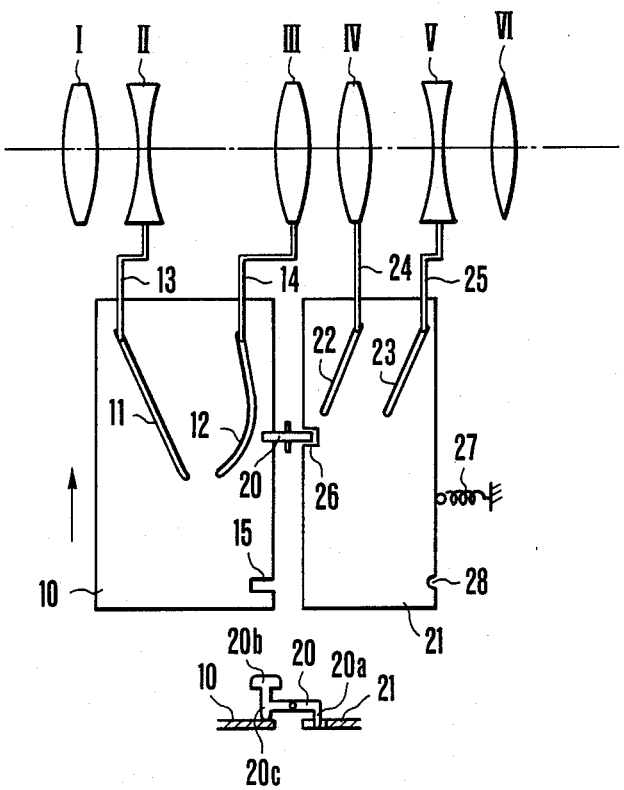
FIG. 8 is an expanded view of an operating mechanism for the zoom lens units.

FIG. 8 illustrates an operating mechanism for the zoom lens of FIG. 2. For convenience, its cam sleeve is depicted in the expanded form.

In FIG. 8, a zooming cam 10 has a variation camming slot 11 for controlling the movement of the lens unit II, and a compensation camming slot 12 for controlling the movement of the lens unit III. Drive connections 13 and 14 to the lens units II and III respectively engage the camming slots 11 and 12. Note, an axially elongated slot is not shown for the purpose of clarity.

A seesaw 20 is pivotally mounted on a pin and is urged by a spring (not shown) to stay in a neutral position. A focal length extending cam 21 has two camming slots 22 and 23. Drive connection members 24 and 25 from the lens units IV and V engage the camming slots 22 and 23 respectively.

26 is a cutout into which one end 20a of the seesaw key lies when in the usual or first zooming range, so that the extending cam 21 is locked.

15 is a cutout provided in the zooming cam 10. As the zooming cam 10 moves in a direction indicated by arrow, when the cutout 15 is aligned with the seesaw key 20, a push button 20b for the seesaw key 20 becomes possible to be pushed down by the operator's finger. When pushed down, an end portion 20c enters the cutout 15, and the other end 20a lifts up, thereby the extending cam 21 is rendered movable. After the extending cam 21 has been moved away downward, so that the end portion 20c is retained in the pushed position. In such a way, the seesaw key 20 can selectively render the zooming cam 10 and the extending cam 21 operative.

27 is a click mechanism operating in such a manner that, as the extending cam 21 moves, when the drive connection members 24 and 25 arrive at the respective ends of the camming slots 22 and 23, a ball drops in a detent groove 28, thereby the extending cam is temporarily locked.

With the mechanism of such construction, for the usual zooming, the operator needs only to move the zooming cam 10, while the extending cam 21 is held stationary by the seesaw key 20. To obtain longer focal lengths than the longest focal length of the usual zooming range, the operator has first to set the zooming cam 10 in the telephoto end, thereby the cutout 15 is brought into alignment with the seesaw key 20. He will then push the button 20b to release the extending cam 21 from the locking connection. As the extending cam 21 is operated to move the lens units IV and V forward, a longer focal length is obtained at the terminal ends of the camming slots.

To take the zoom lens out of this state, the operator needs only to turn the extending cam 21 in the reverse direction. When the cutout comes to the position of the seesaw key 20, its end portion 20a drops into this cutout, thereby the other end is lifted up to allow for movement of the zooming cam 10.

What is claimed is:

1. A zoom lens comprising:
(a) a first zoom section having a plurality of movable lens units which simultaneously move along an optical axis to effect a first zooming; and
(b) a second zoom section arranged in rear of said first zoom section and including a front lens unit of positive refractive power and a rear lens unit of negative refractive power successively which move along the optical axis to effect a second zooming,
wherein said front and said rear lens units are simultaneously moved in such a way that the image magnification of the rear lens unit remains positive in the entire range of movement of said front and rear lens units.

2. A zoom lens according to claim 1, satisfying the following conditions:

$$\frac{1}{2} |fR| < f1 < fT$$

$$|F2| < f2 < fT$$

where f1 and f2 are the focal lengths of said front and said rear lens units respectively, fT is the focal length of the entire system when said first zoom section lies in the telephoto end of the zooming range thereof, fR is the composite focal length of said front and said rear lens units before they are moved to extend the focal length of the entire system, and $|F2|$ is the absolute value of the focal length of that movable lens unit which has the shortest focal length among the first zoom section.

3. A zoom lens according to claim 2, wherein said second zoom section includes a lens unit of positive refractive power behind said rear lens unit.

4. A zoom lens according to claim 1, wherein said front lens unit and said rear lens unit move forward to increase the focal length of the entire system.

5. A zoom lens according to claim 4, wherein the speed of movement of said rear lens unit is slower than that of movement of said front lens unit.

6. A zoom lens according to claim 1, wherein the light rays emerging from the rearmost movable lens unit in said first zoom section directly enter said front lens unit.

7. A zoom lens according to claim 6, wherein said rearmost movable lens unit moves first rearward and then forward, the change of direction occurring at an intermediate point in the zooming range.

8. A zoom lens comprising:
(a) a first zoom section having a plurality of movable lens units which simultaneously move to effect zooming; and
(b) a second zoom section arranged in rear of said first zoom section and including a front lens unit of positive refractive power and a rear lens unit of negative refractive power successively which are movable along an optical axis;
said first zoom section being movable while said second zoom section is stationary and said second zoom section being movable while said first zoom section is stationary;
wherein said front and said rear lens units are simultaneously moved in such a way that the image magnification of the rear lens unit remains positive in the entire range of movement of said front and rear lens units.

9. A zoom lens according to claim 8, satisfying the following conditions:

$$\frac{1}{2} |fR| < f1 < fT$$

$$|F2| < f2 < fT$$

where f1 and f2 are the focal lengths of said front and said rear lens units respectively, fT is the focal length of the entire system when said first zoom section lies in the telephoto end of the zooming range thereof, fR is the composite focal length of said front and said rear lens units before they are moved to extend the focal length of the entire system, and $|F2|$ is the absolute value of the focal length of that movable lens unit which has the shortest focal length among the first zoom section.

10. A zoom lens according to claim 9, wherein said second zoom section includes a lens unit of positive refractive power behind said rear lens unit.

11. A zoom lens according to claim 8, wherein said front lens unit and said rear lens unit move forward to increase the focal length of the entire system.

12. A zoom lens according to claim 11, wherein the speed of movement of said rear lens unit is slower than that of movement of said front lens unit.

13. A zoom lens according to claim 8, wherein the light rays emerging from the rearmost movable lens unit in said first zoom section directly enter said front lens unit.

14. A zoom lens according to claim 13, wherein said rearmost movable lens unit moves first rearward and then forward, the change of direction occurring at an intermediate point in the zooming range.

* * * * *